Patented Nov. 3, 1936

2,059,196

UNITED STATES PATENT OFFICE 2,059,196

ARYL MERCURY SALTS OF OXYACIDS OF CHROMIUM

Carl N. Andersen, Watertown, Mass., assignor to Lever Brothers Company, a corporation of Maine No Drawing. Application January 9, 1935, Serial No. 968

6 Claims. (Cl. 260—13)

The present invention relates to the production of certain new organic mercury compounds.

It is an object of my invention to produce new organic mercury compounds useful as germicides and for other therapeutic purposes.

More particularly, it is an object of my invention to prepare certain new organic mercury chromates.

I have discovered that when the acidic hydrogens of the chromic acids are replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having the general formula $(RHg)_2.R_1$, in which R represents an aromatic structure, to a carbon atom of which the mercury is directly attached; and in which $R_1$ represents an acidic radical corresponding to a mono or polychromic acid, which is linked to the RHg groups through the replacement of the acidic hydrogen atoms.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon, or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The mono or polychromic acid radical $R_1$ may correspond to chromic acid, $H_2CrO_4$; dichromic acid, $H_2Cr_2O_7$; trichromic acid, $H_2Cr_3O_{10}$; or tetrachromic acid, $H_2Cr_4O_{13}$. In some instances these compounds exist in the form of their anhydrides or salts.

The general method of producing these chromates consists in reacting together the acid and a compound containing an aromatic mercury radical of the above mentioned type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a method of preparing aromatic mercury compounds of this type by reacting an acidic compound with an aromatic mercury hydroxide. This reaction is one of neutralization of an acid and base to form a salt and water. This has the advantage that water is the only other product produced and the resulting compound may be easily purified. In my application Serial No. 694,199, filed October 18, 1933, I have disclosed another method of preparing aromatic mercury compounds of this type by employing a soluble aromatic mercury salt, for example, the acetate, in a reaction with the acidic compound. The aromatic mercury compounds produced are of a relatively low solubility as compared with the aromatic mercury salt and are relatively insoluble as compared with the acidic compound. Either of these methods may be employed in producing the compounds comprising this invention.

The following examples are given merely as illustrative of a method by which all the compounds of this group may be prepared and as illustrative of compounds falling within the scope of my invention:

Example 1

17.64 grams of phenylmercury hydroxide is dissolved in 4 liters of water and heated until solution is complete. The solution is filtered to remove any insoluble material. To the filtrate is added 6.6 grams of chromic trioxide (the anhydride of chromic acid) in aqueous solution. A yellow precipitate results. The mixture is allowed to stand, after which it is filtered, and the precipitate washed with warm water and dried. The material does not melt up to 250° C. and is the compound phenylmercury chromate.

Example 2

8.94 grams of sodium dichromate $$(Na_2Cr_2O_7 \cdot 2H_2O)$$

is dissolved in 200 cc. of water. When solution is complete a theoretical amount of sulphuric acid (5.88 grams of 100% sulphuric acid) is added to convert the salt into the corresponding acid.

Another solution is prepared by dissolving 17.64 grams of phenylmercury hydroxide in 2 liters of water and heating until solution is complete. This solution is then filtered to remove any gum or insoluble material. To this solution is then added the dichromic acid solution. A light yellow precipitate results and the mixture is set aside and allowed to stand for some time, after which the precipitate is separated by filtration, washed well with warm water and allowed to dry. The material begins to decompose above 220° C. and does not melt up to 250° C. It is the compound phenylmercury dichromate.

In each of the above examples, the reacting materials are employed in substantially theoretical quantities, but with a slight excess of the acid in order to assure the complete conversion of the aromatic mercury compound.

Any suitable solvent in which the reacting components are soluble may be used as the medium for carrying out the reaction provided they do not react chemically with the solutes. If they are both soluble in water this is generally used for reasons of convenience, but other solvents, as for example the alcohols, which do not undergo oxidation with chromic oxides, or mixtures of these alcohols with water, may be employed. The process may be carried out at any temperature, for example, room temperature. In most cases I find, however, that the use of heat assists in the solution of the reacting components and speeds the reaction.

From the description of the specific examples, it will be readily apparent to one skilled in the art how other members of the above identified group may be reacted with an aromatic mercury compound to produce mercury compounds of analogous structure.

All of the compounds produced as above described are characterized by extraordinarily high potency as germicides. Tests to determine their efficacy in killing B. Typhosus and Staph. aureus were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against Eberthella typhi (typhoid bacillus) at 37° C. and F. D. A. special method against Staph. aureus at 37° C.

As illustrative of the potency of the compounds, the killing power of phenylmercury chromate is given merely as illustrative. The figures represent the maximum dilutions at which killing in 15 minutes resulted:

|  | B. Typhosus | Staph. aureus |
|---|---|---|
| Phenylmercury chromate | 1:80,000 | 1:50,000 |

Because of the high germicidal value of these compounds it is possible to use them in extreme dilutions and in many situations where known germicides, because of toxic or other undesired properties, can not be employed. They may be used externally and locally, and in some cases administered internally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

What I claim is:

1. A new organic mercury compound of the general formula $(RHg)_2 \cdot R_1$ in which R represents an aromatic structure, to a carbon atom of which the mercury is directly attached, and in which none of the carbon atoms has direct linkage with any element other than hydrogen, carbon and mercury; and in which $R_1$ represents an acidic radical containing chromium and oxygen which is linked to the RHg groups through the replacement of the acidic hydrogen atoms.

2. A new organic mercury compound of the general formula $(C_6H_5Hg)_2 \cdot R_1$, in which $R_1$ represents an acidic radical containing chromium and oxygen which is linked to the RHg groups through the replacement of the acidic hydrogen atoms.

3. A new organic mercury compound of the general formula $(RHg)_2 CrO_4$, in which R represents an aromatic structure, to a carbon atom of which the mercury is directly attached, and in which none of the carbon atoms has direct linkage with any element other than hydrogen, carbon and mercury.

4. Phenylmercury chromate.

5. A new organic mercury compound of the general formula $(RHg)_2 Cr_2O_7$, in which R represents an aromatic structure, to a carbon atom of which the mercury is directly attached, and in which none of the carbon atoms has direct linkage with any element other than hydrogen, carbon and mercury.

6. Phenylmercury dichromate.

CARL N. ANDERSEN.